United States Patent
Hang et al.

(10) Patent No.: US 7,475,323 B2
(45) Date of Patent: Jan. 6, 2009

(54) METHOD AND APPARATUS FOR RECEIVING A CONTROL CHANNEL IN A WIRELESS COMMUNICATION SYSTEM

(75) Inventors: Ling Hang, San Diego, CA (US); Bao Nguyen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 519 days.

(21) Appl. No.: 11/054,773

(22) Filed: Feb. 9, 2005

(65) Prior Publication Data

US 2006/0041820 A1    Feb. 23, 2006

Related U.S. Application Data

(60) Provisional application No. 60/603,185, filed on Aug. 20, 2004.

(51) Int. Cl.
   *H03M 13/00* (2006.01)
(52) U.S. Cl. .................................................. 714/758
(58) Field of Classification Search ................ 714/746, 714/758, 776
   See application file for complete search history.

(56) References Cited

U.S. PATENT DOCUMENTS

| | | | |
|---|---|---|---|
| 5,734,645 A * | 3/1998 | Raith et al. ................. | 370/329 |
| 6,438,119 B1 * | 8/2002 | Kim et al. .................... | 370/335 |
| 6,594,244 B1 | 7/2003 | Chang et al. ................ | 370/335 |
| 6,622,278 B1 * | 9/2003 | Morgan et al. .............. | 714/758 |
| 6,760,877 B1 * | 7/2004 | Lappetelainen et al. ..... | 714/748 |
| 7,185,266 B2 * | 2/2007 | Blightman et al. .......... | 714/776 |
| 7,257,760 B2 * | 8/2007 | Rick et al. ................... | 714/760 |
| 2004/0082356 A1 | 4/2004 | Walton et al. ............... | 455/522 |
| 2004/0156328 A1 | 8/2004 | Walton et al. ............... | 370/313 |
| 2005/0193315 A1 * | 9/2005 | Bertinelli et al. ............ | 714/758 |

* cited by examiner

*Primary Examiner*—Shelly A Chase
(74) *Attorney, Agent, or Firm*—Howard H. Seo; Jeffrey D. Jacobs; Thomas R. Rouse (57) ABSTRACT

A higher layer at a base station generates and passes messages to Layer 2, which generates and appends a CRC value to each message. The messages are encapsulated in frames at the physical layer, which generates and appends a CRC value to each frame. The base station transmits the frames on a control channel. The physical layer at a wireless device processes the control channel and decodes each received frame to obtain a decoded frame. The physical layer forwards the decoded frame to Layer 2, regardless of whether the frame passes or fails a CRC test. Layer 2 processes the decoded frame, even if the decoded frame fails the CRC test, to extract messages sent in the decoded frame. Layer 2 checks each extracted message based on its CRC value and forwards each message that passes the CRC test to the higher layer.

24 Claims, 6 Drawing Sheets

METHOD AND APPARATUS FOR RECEIVING A CONTROL CHANNEL IN A WIRELESS COMMUNICATION SYSTEM

The present Application for Patent claims priority to Provisional Application No. 60/603,185 entitled "Method to Lower Message Error Rate on BCCH and FCCCH and Enhance Mobile Standby Performance" filed Aug. 20, 2004, and assigned to the assignee hereof and hereby expressly incorporated by reference herein.

BACKGROUND

I. Field

The present invention relates generally to communication, and more specifically to a method and apparatus for receiving a control channel in a wireless communication system.

II. Background

A base station in a wireless communication system (e.g., a cellular system) may transmit various types of messages to wireless devices. These messages may include user-specific messages sent to specific wireless devices, multi-cast messages sent to a group of wireless devices, and/or broadcast messages sent to all wireless devices. The system typically employs a protocol stack to process messages for transmission and reception. The protocol stack includes a number of layers such as Layers 1, 2, and 3, which are often referred to as a physical layer, a link layer, and a higher layer, respectively. Data is passed downward between the layers in the protocol stack at a transmitter and passed upward in the protocol stack at a receiver.

At the base station, an application at Layer 3 generates messages for the wireless devices and passes these messages to Layer 2. Layer 2 processes the messages from Layer 3 to achieve the functionality designed for Layer 2 and provides frames to the physical layer. There may be no defined relationships between the messages and frames, and each frame may carry a partial message, a complete message, or multiple partial and/or complete messages. The physical layer processes (e.g., encodes and modulates) each frame in accordance with a control channel used to send the frame. The physical layer typically employs an error detection code, such as a cyclic redundancy check (CRC) code. The physical layer would then generate a CRC value for each frame and append the CRC value to the frame. The CRC allows the wireless devices to perform error detection to improve data reliability. The base station transmits the frames via a wireless channel.

A wireless device performs the complementary processing to recover the messages sent by the base station. The physical layer at the wireless device processes (e.g., demodulates and decodes) data received via the wireless channel and further performs error detection for each decoded frame. The physical layer typically forwards frames that are decoded correctly (which are called good frames) and discards frames that are decoded in error (which are called erased frames). Layer 2 processes the good frames obtained from the physical layer, recovers the messages sent by the base station, and forwards the recovered messages up to the higher layer.

The wireless device inevitably receives some frames in error because of noise and other impairments in the wireless channel. The percentage of erased frames may be relatively high for an impaired wireless channel with poor channel conditions. The wireless device typically loses all messages sent in the erased frames. The higher layer would then utilize the available recovery mechanisms to deal with the lost messages in the erased frames. The performance of the wireless device typically degrades due to the lost messages.

There is therefore a need in the art for techniques to improve the likelihood of recovering messages sent in a wireless communication system.

SUMMARY

Techniques for processing messages received via a control channel in a wireless communication system are described herein. A higher layer at a transmitter (e.g., Layer 3 at a base station) generates and passes messages to the next lower layer (e.g., Layer 2), which generates and appends a CRC value to each message. The messages are encapsulated in frames at a physical layer (e.g., Layer 1), which generates and appends a CRC value to each frame. The frames are sent on one or more control channels. Certain control channels, such as a broadcast control channel and a forward common control channel, often carry more than one message in each frame.

The physical layer at a receiver (e.g., a wireless device) processes a control channel and decodes each frame received on the control channel to obtain a decoded frame. The physical layer may also check the decoded frame based on the CRC value appended to the frame. The physical layer forwards the decoded frame to Layer 2 regardless of whether the frame passes or fails the CRC test. Layer 2 processes the decoded frame, even if the decoded frame fails the CRC test, to extract messages sent in the decoded frame. Layer 2 also checks each extracted message based on the CRC value appended to the message and forwards each message that passes the CRC test to the higher layer. The CRC used for the messages may be stronger than the CRC used for the frames, and the CRC for the messages may be relied upon for error detection.

The message processing techniques can improve the likelihood of recovering messages, prolong battery life, extend standby time, and provide other benefits, as described below. Various aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The message processing techniques described herein may be used for various wireless and wireline communication systems such as a Code Division Multiple Access (CDMA) system, a Time Division Multiple Access (TDMA) system, a Frequency Division Multiple Access (FDMA) system, an Orthogonal Frequency Division Multiple Access (OFDMA) system, and so on. A CDMA system may implement one or more CDMA radio access technologies (RATs) such as cdma2000, Wideband-CDMA (W-CDMA), and so on. cdma2000 covers IS-2000, IS-856, and IS-95 standards. A TDMA system may implement one or more TDMA RATs such as Global System for Mobile Communications (GSM). These various RATs and standards are known in the art. The techniques may be used for the forward link (or downlink) as well as the reverse link (or uplink).

For clarity, the message processing techniques are specifically described below for a broadcast control channel (BCCH) and a forward common control channel (FCCCH), which are control channels at the physical layer in cdma2000. The BCCH is generally used to send messages for all wireless devices, such as overhead messages containing system information. The FCCCH is generally used to send user-specific messages to the wireless devices, such as page messages. The BCCH and FCCCH are described in 3GPP2 C.S0003-D, entitled "Medium Access Control (MAC) Standard for cdma2000 Spread Spectrum Systems Release D," and 3GPP2 C.S0002-D Version 1.0, entitled "Physical Layer Standard for cdma2000 Spread Spectrum Systems Revision D," both dated Feb. 13, 2004 and publicly available.

Figure 1:
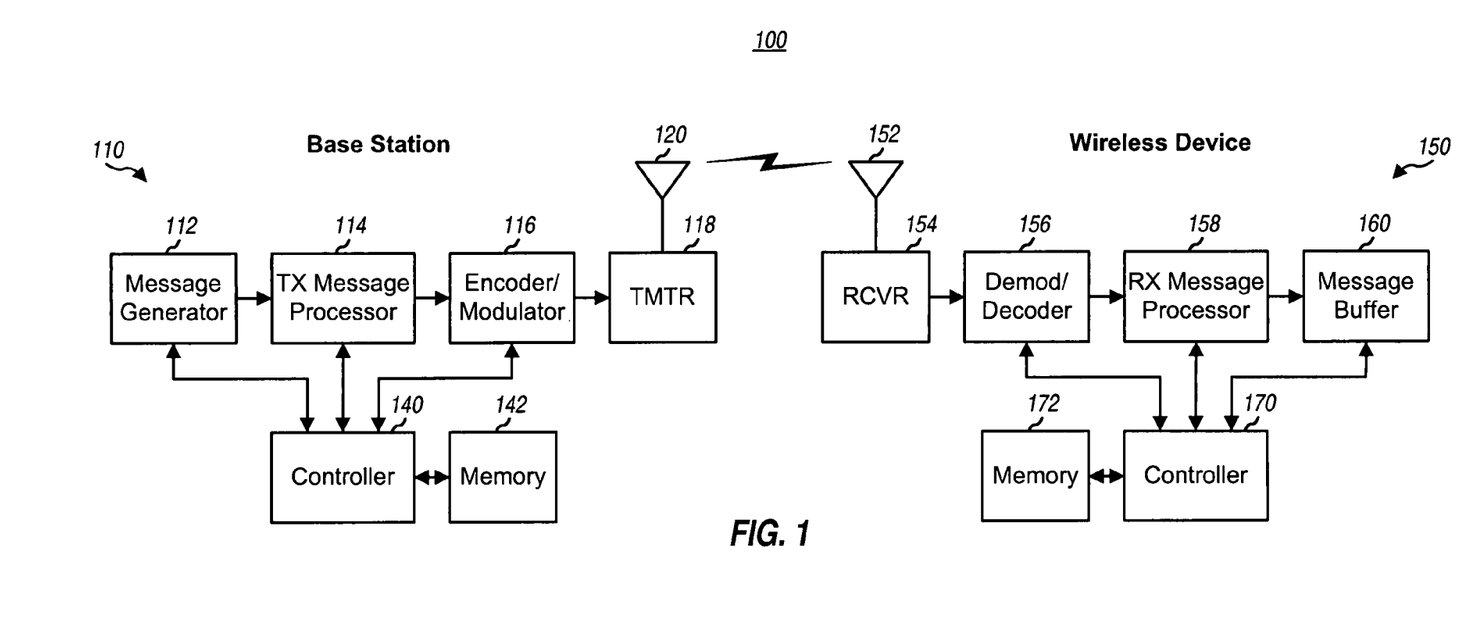
FIG. 1 shows a block diagram of a base station and a wireless device.

FIG. 1 shows a block diagram of an embodiment of a base station 110 and a wireless device 150 in a wireless communication system 100 (e.g., a cdma2000 system). A base station is typically a fixed station that communicates with the wireless devices and may also be called a base transceiver system (BTS), a node B, an access point, or some other terminology. A wireless device may be fixed or mobile and may also be called a mobile station, a user equipment, a user terminal, a handset, a subscriber unit, or some other terminology.

At base station 110, a message generator 112 generates messages for wireless devices. These messages may include broadcast and signaling messages to be sent on the BCCH and FCCCH and/or other messages for other control channels. The messages may carry various types of information such as pages, system information, signaling, and so on. A transmit (TX) message processor 114 receives the messages from generator 112, processes these messages as specified by the system, generates and appends a CRC value for each message, and provides frames of data. Each frame is a unit of data to be sent on a control channel within a designated time duration. An encoder/modulator 116 receives and processes (e.g., encodes, interleaves, and modulates) the frames from processor 114, generates and appends a CRC value to each frame, and provides a stream of data chips. The encapsulation of messages in frames and the CRC generation are described below. A transmitter unit (TMTR) 118 receives and processes (e.g., converts to analog, amplifies, filters, and frequency upconverts) the data chip stream and generates a modulated signal, which is transmitted via an antenna 120.

At wireless device 150, an antenna 152 receives the modulated signal transmitted by base station 110 and provides a received signal to a receiver unit (RCVR) 154. Receiver unit 154 conditions (e.g., filters, amplifies, and frequency downconverts) the received signal, digitizes the conditioned signal, and provides a stream of data samples. A demodulator (Demod)/decoder 156 processes (e.g., demodulates, deinterleaves, and decodes) the data samples to obtain decoded frames. Decoder 156 further checks each decoded frame based on the appended CRC and provides the status of the decoded frame (e.g., good or erased). A receive (RX) message processor 158 processes the decoded frames, recovers the messages sent in these frames, and provides the recovered messages to a message buffer 160 and/or a controller 170.

Controllers 140 and 170 direct the operation of various processing units at base station 110 and wireless device 150, respectively. Memory units 142 and 172 store program codes and data used by controllers 140 and 170, respectively.

Figure 2:
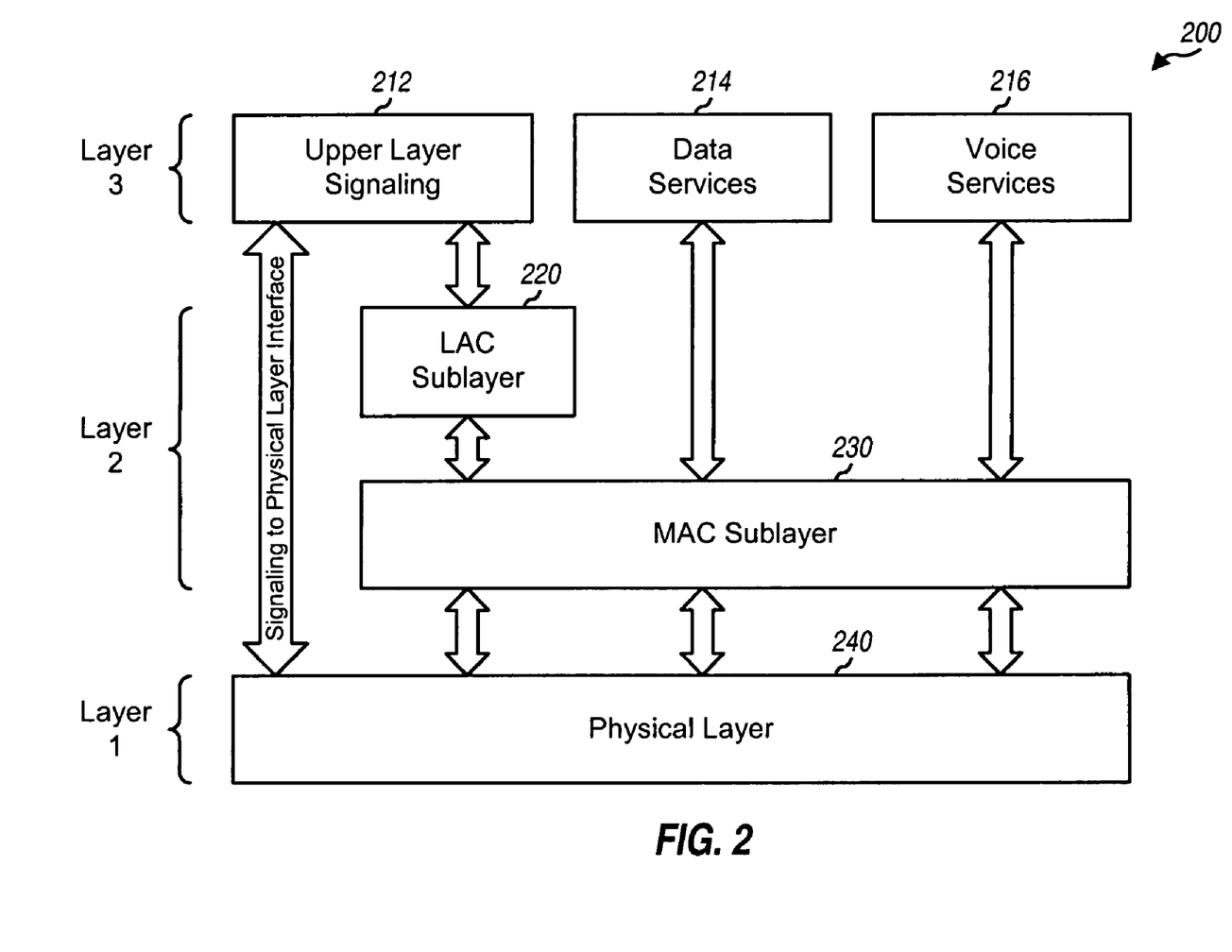
FIG. 2 shows a layer structure defined by cdma2000 Release D.

FIG. 2 shows a layer structure 200 defined by cdma2000 Release D. Layer structure 200 includes (1) applications and upper layer protocols that approximately correspond to Layer 3 of an ISO/OSI reference model, (2) protocols and services that correspond to Layer 2 (the link layer), and (3) protocols and services that correspond to Layer 1 (the physical layer).

Layer 3 includes various applications and upper layer protocols, such as signaling services 212, packet data services 214, voice services 216, circuit-switched data services (not shown), and so on. Signaling services 212 in Layer 3 originate and terminate messages according to the semantics and timing of the communication protocol between the base station and the wireless device. Layer 3 utilizes the services provided by Layer 2.

Layer 2 supports the delivery of signaling messages generated by Layer 3. Layer 2 includes two sublayers: a Link Access Control (LAC) sublayer 220 and a Medium Access Control (MAC) sublayer 230. The LAC sublayer implements a data link protocol that provides for the correct transport and delivery of signaling messages generated by Layer 3. The LAC sublayer utilizes the services provided by the MAC sublayer and Layer 1. The MAC sublayer implements a medium access protocol that is responsible for transporting LAC protocol data units (PDUs) using the services provided by Layer 1. The LAC sublayer is described in a document 3GPP2 C.S0004-D Version 1.0, entitled "Signaling Link Access Control (LAC) Standard for cdma2000 Spread Spectrum Systems Release D," Feb. 13, 2004, which is publicly available. The MAC sublayer is described in the aforementioned 3GPP2 C.S0003-D document.

Layer 1 (physical layer 240) supports transmission and reception of radio signals between the base station and the wireless device. The physical layer is described in the aforementioned 3GPP2 C.S0002-D document.

Figure 3:
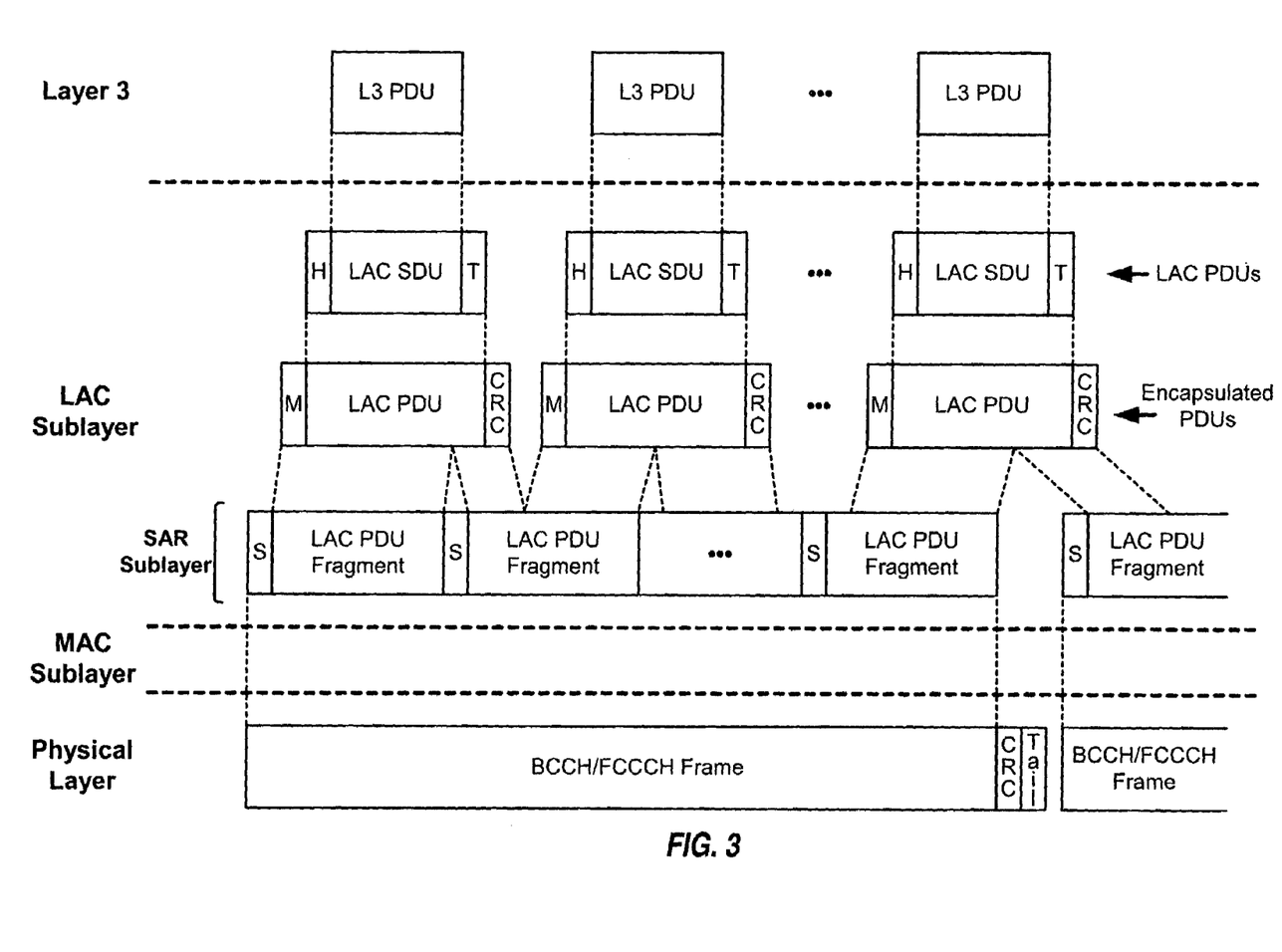
FIG. 3 shows encapsulation of messages by the LAC and MAC sublayers.

FIG. 3 shows the processing and encapsulation of messages by the LAC and MAC sublayers at the base station. Layer 3 generates messages for transmission from the base station to the wireless devices. Each message represents a signaling data unit and is provided by Layer 3 as an L3 PDU.

The LAC sublayer receives the L3 PDUs, with each L3 PDU being called a LAC service data unit (SDU) at the LAC sublayer. The LAC sublayer includes multiple sublayers. The upper sublayers within the LAC sublayer generate a header (labeled as "H" in FIG. 3) and a trailer (labeled as "T") for each LAC SDU. Different headers are used for different types of messages. The header may include, for example, (1) a protocol field that identifies the LAC protocol version, (2) a message ID field that identifies the action or use for the LAC SDU (e.g., for authentication, configuration of parameters, and so on), (3) an encryption indicator field that indicates whether the LAC SDU is encrypted, and/or (4) a sequence number for the LAC SDU. The trailer typically includes padding bits. The combination of the LAC SDU and its header and trailer is called a LAC PDU.

A segmentation and reassembly (SAR) sublayer within the LAC sublayer receives the LAC PDUs and generates an encapsulated PDU for each LAC PDU. The messages from Layer 3 have variable lengths and hence the encapsulated PDUs also have variable lengths. Each encapsulated PDU includes two fields carrying LAC PDU size information and a CRC field carrying a 30-bit CRC value generated by the SAR sublayer for all fields in the encapsulated PDU. Table 1 lists the fields for each encapsulated PDU. The combination of the EXT_MSG_LENGTH field and the MSG_LENGTH field is labeled as "M" in FIG. 3.

TABLE 1

| Field | Length (bits) | Description |
|---|---|---|
| EXT_MSG_LENGTH | 1 | '0': LAC PDU size is less than or equal to 978 bits. '1': LAC PDU size is greater than 978 bits. |
| MSG_LENGTH | 7, 8, or 15 | Indicates the size of the LAC PDU (in bytes). |
| LAC PDU | variable | LAC PDU received by the SAR sublayer. |
| CRC | 30 | CRC value generated by the SAR sublayer. |

The EXT_MSG_LENGTH field is included in each encapsulated PDU sent on the BCCH or FCCCH but may be omitted for other physical layer channels.

For the FCCCH, the SAR sublayer partitions the variable-size encapsulated PDUs into fixed-size LAC PDU fragments, as shown in FIG. 3. The SAR sublayer pre-appends each LAC PDU fragment with a 2-bit Segmentation Indicator (SI) field, which is labeled as "S" in FIG. 3. This SI field indicates whether the first encapsulated PDU sent in the LAC PDU fragment is a synchronized encapsulated PDU or an unsynchronized encapsulated PDU. A synchronized encapsulated PDU is an encapsulated PDU that is sent starting in the LAC PDU fragment, so that the first byte of the encapsulated PDU is sent in the first byte of the LAC PDU fragment. An unsynchronized encapsulated PDU is an encapsulated PDU that is sent starting in a prior LAC PDU fragment. The SAR sublayer typically attempts to pack encapsulated PDUs into the available LAC PDU fragments as efficiently as possible without regard to fragment boundary. Each LAC PDU fragment may carry any number of encapsulated PDUs and all or a portion of each encapsulated PDU sent in the LAC PDU fragment. The SI field is used for message recovery.

The SAR sublayer forwards the LAC PDU fragments to the MAC sublayer. Each LAC PDU fragment is called a MAC SDU at the MAC sublayer. The MAC sublayer processes the MAC SDUs and provides MAC frames to the physical layer. The physical layer processes the MAC frames to generate FCCCH frames, which are the transmission units for the FCCCH.

The FCCCH may be transmitted using one of three possible FCCCH frame sizes. Each FCCCH frame may carry two, four, or eight MAC SDUs (or equivalently, two, four, or eight LAC PDU fragments) depending on the FCCCH frame size. The physical layer generates and appends a 12-bit or 16-bit CRC value to each FCCCH frame and also appends 8 tail bits. The tail bits are used to flush out a convolutional encoder used to encode the FCCCH.

For the BCCH, the SAR sublayer partitions the variable-size encapsulated PDUs into fixed-size BCCH subslots. Each BCCH subslot includes a 1-bit Synchronized Capsule Indicator (SCI) field and a BCCH subslot body. The SCI field indicates whether the first encapsulated PDU sent in the BCCH subslot is a synchronized encapsulated PDU or an unsynchronized encapsulated PDU. The BCCH subslot body carries the data payload for the BCCH subslot. The SAR sublayer typically attempts to pack encapsulated PDUs into the available BCCH subslots as efficiently as possible without regard to subslot boundary. Each BCCH subslot may carry any number of encapsulated PDUs and all or a portion of each encapsulated PDU sent in the BCCH subslot.

The SAR sublayer forwards the BCCH subslots to the MAC sublayer. Each BCCH subslot is called a MAC SDU at the MAC sublayer. The MAC sublayer processes the MAC SDUs and provides MAC frames to the physical layer. The physical layer processes each MAC frame to generate a corresponding BCCH frame, which is a unit of transmission for the BCCH.

The BCCH is transmitted using one BCCH frame size. Each BCCH frame carries eight BCCH subslots. The physical layer generates and appends a 16-bit CRC value to each BCCH frame and also appends 8 tail bits.

Table 2 lists various frame, fragment, and subslot parameters for the BCCH and FCCCH. A BCCH frame with 768 total bits may be sent in 40, 80, or 160 milliseconds (ms) at a data rate of 19200, 9600, or 4800 bits/second (bps), respectively. Each BCCH frame carries 744 data bits, 16 CRC bits, and 8 tail bits, or 768 total bits. An FCCCH frame with 192 total bits may be sent in 5, 10, or 20 ms at a data rate of 38400, 19200, or 9600 bps, respectively. An FCCCH frame with 384 total bits may be sent in 10 or 20 ms at a data rate of 38400 or 19200, respectively. An FCCCH frame with 768 total bits may be sent in 20 ms at a data rate of 38400. Each 192-bit FCCCH frame carries 172 data bits, 12 CRC bits, and 8 tail bits. Each 384-bit FCCCH frame carries 360 data bits, 16 CRC bits, and 8 tail bits. Each 768-bit FCCCH frame carries 744 data bits, 16 CRC bits, and 8 tail bits.

TABLE 2

| Control Channel | Frame size (# total bits) | Frame size (# data bits) | Fragment or subslot size (# total bits) | Number of fragments or subslots/frame |
|---|---|---|---|---|
| BCCH | 768 | 744 | 93 | 8 |
| FCCCH | 192 | 172 | 86 | 2 |
|  | 384 | 360 | 90 | 4 |
|  | 768 | 744 | 93 | 8 |

Figure 4:
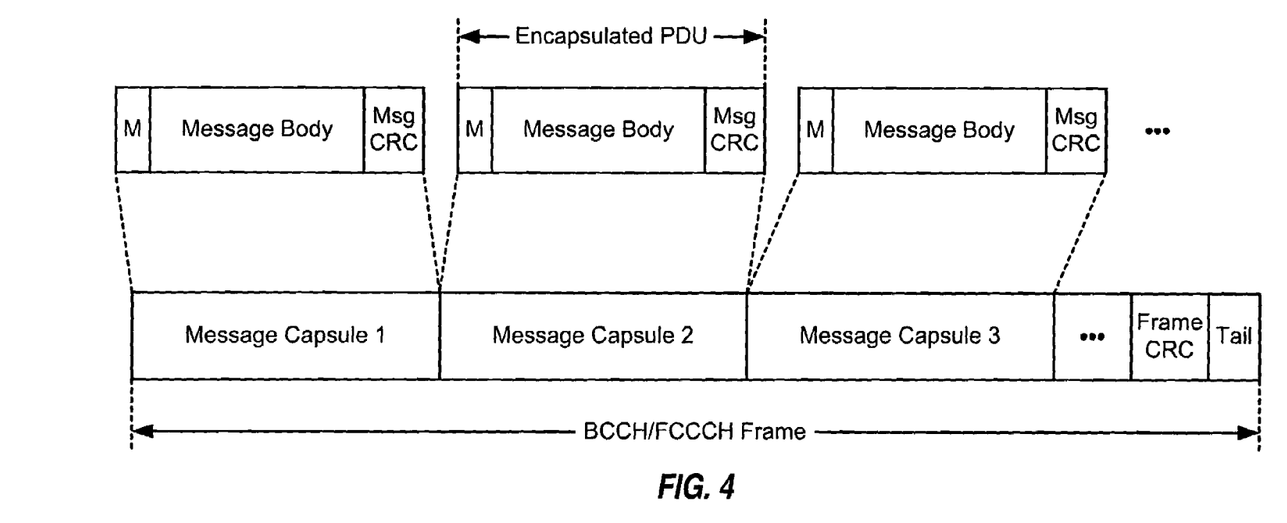
FIG. 4 shows encapsulation of messages in a frame.

FIG. 4 shows a simplified view of the encapsulation of messages in a frame, which may be a BCCH frame or an FCCCH frame. The fragmentation by the SAR sublayer and the processing by the MAC sublayer may be omitted for simplicity. Each message capsule corresponds to one encapsulated PDU and includes all of the fields for the encapsulated PDU shown in FIG. 3. The message body carries the message from Layer 3 as well as other fields appended by the LAC sublayer. The message capsules are encapsulated in the frame. In general, there are no defined relationships between message capsules and frames. Each frame may carry a partial message capsule, one complete message capsule, or multiple complete and/or partial message capsules. Each message capsule carries a CRC generated for that capsule. Each frame also carries a CRC generated for that frame.

At the wireless device, the physical layer processes (e.g., demodulates, deinterleaves, and decodes) each frame received from the base station and further checks each decoded frame based on the frame CRC. Conventionally, the physical layer forwards only decoded frames that pass the CRC test and discards all frames that fail the CRC test. All of the messages carried by the discarded frames would also be lost. The reasons for discarding the erased frames are to maintain independence among the layers and to ensure that known good data is passed between the layers.

For the BCCH and FCCCH, each frame typically carries more than one message capsule. In fact, field testing indicates that, for the BCCH and FCCCH, each frame carries three to four message capsules on average. Furthermore, each frame that fails the CRC test typically contains some valid data. Most of the time, the erased frame contains corrupted data in only a portion of the frame and valid data in the remaining portion of the frame. Hence, it may be possible to recover good messages from the erased frame. The CRC appended to each message may be used to determine whether the message is good or erased. The 30-bit CRC used for the messages sent on the BCCH and FCCCH is stronger than the 12-bit and 16-bit CRCs used for the BCCH and FCCCH frames. The CRC used for the messages may thus be relied upon exclusively for error detection without sacrificing performance.

Figure 5:
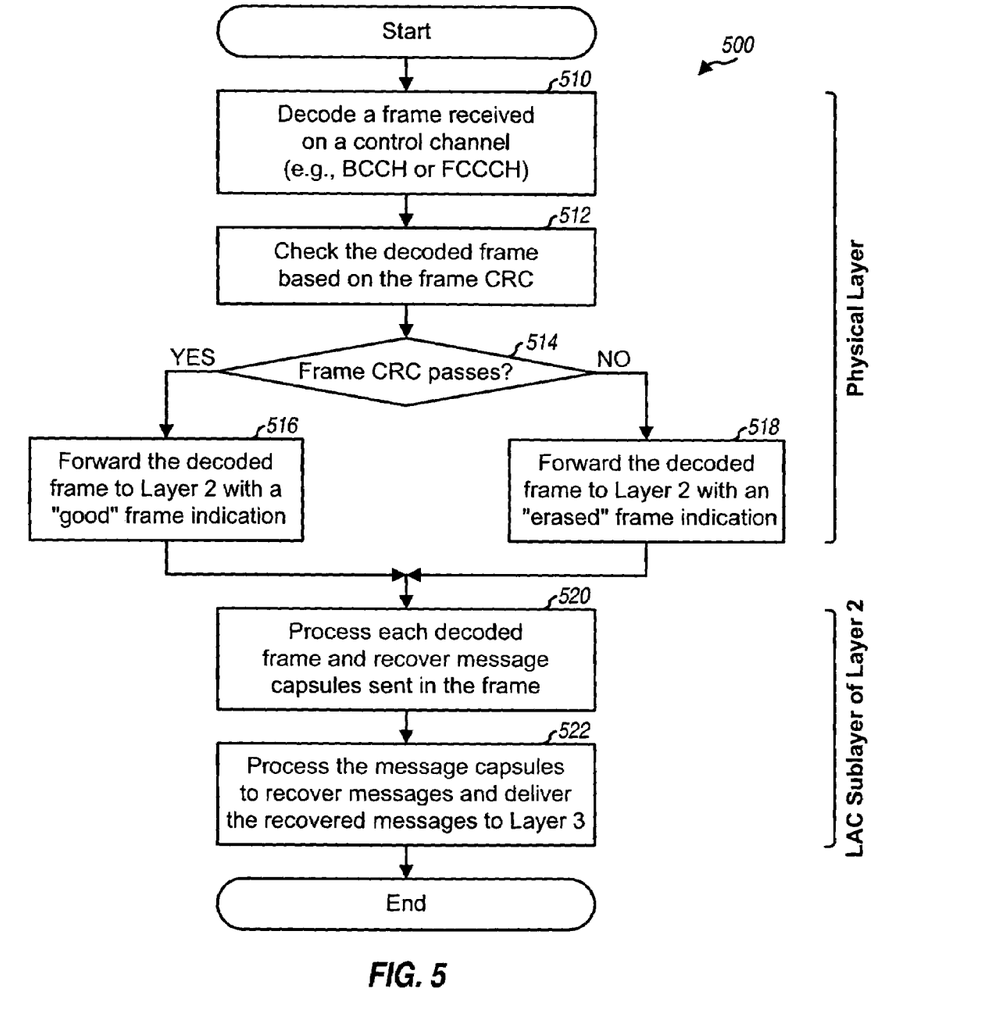
FIG. 5 shows a process for receiving messages sent on a control channel.

FIG. 5 shows a process 500 for receiving messages sent on a control channel (e.g., the BCCH or FCCCH). Process 500 covers the processing by the physical layer and the LAC sublayer at a wireless device.

Initially, the physical layer decodes a frame received on the control channel (block 510). The physical layer then checks the decoded frame based on the frame CRC (block 512). If the frame CRC passes and the answer is 'Yes' for block 514, then the physical layer forwards the decoded frame to Layer 2 with a "good" frame indication (block 516). Otherwise, if the frame CRC fails and the answer is 'No' for block 514, then the physical layer forwards the decoded frame to Layer 2 with an "erased" frame indication (block 518). The frame indication may be used for logging and/or other purposes.

The MAC sublayer processes each decoded frame in the normal manner and provides a corresponding MAC frame (not shown in FIG. 5). The SAR sublayer within the LAC sublayer processes the MAC frame for each decoded frame and recovers the message capsules sent in the frame (block 520). Block 520 is described in further detail below. Other sublayers within the LAC sublayer process the message capsules to recover messages and deliver the recovered messages to Layer 3 (block 522).

Figure 6:
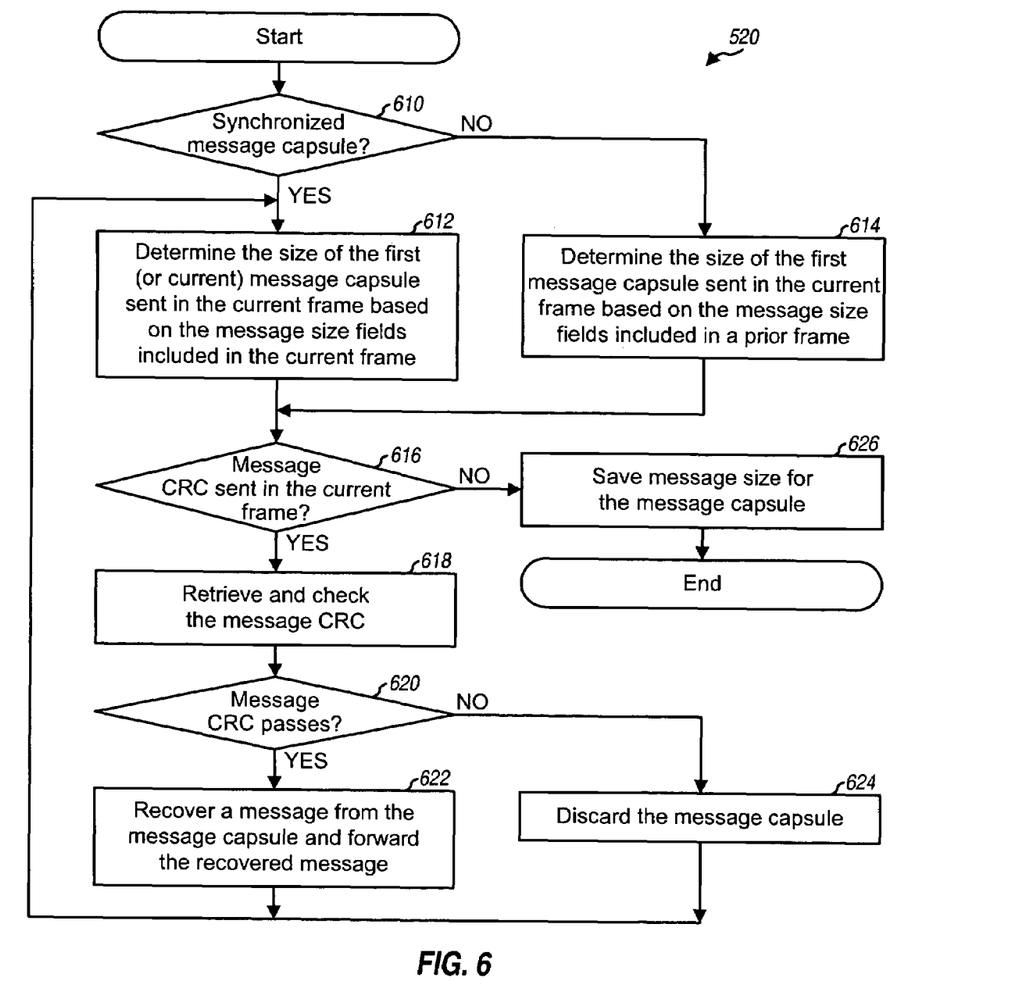
FIG. 6 shows a process to recover messages from a decoded frame.

FIG. 6 shows an embodiment of block 520 in FIG. 5, which is a process to recover messages from a frame. This process is performed by the SAR sublayer for each MAC frame received from the MAC sublayer.

A determination is initially made whether the frame carries a synchronized message capsule (block 610). If the answer is 'Yes', then the message size information sent in the EXT_MSG_LENGTH and MSG_LENGTH fields of the first message capsule is obtained from the frame (block 612). If the frame carries an unsynchronized message capsule and the answer is 'No' for block 610, then the message size information for the first message capsule in the current frame is obtained from a prior frame (block 614). The message size is thus determined based on information sent in the current frame (block 612) or the prior frame (block 614).

A determination is then made whether the CRC value for the first message capsule is included in the current frame (block 616). If the answer is 'No' for block 616, which indicates that the current message capsule is segmented and continues in the next frame, then the message size information for the current message capsule is saved (block 626), and the processing for the frame terminates. Otherwise, if the answer is 'Yes' for block 616, then the CRC value is retrieved and checked against a newly generated CRC value for the message capsule (block 618). If the message CRC passes and the answer is 'Yes' for block 620, then a message is recovered from the body of the message capsule and passed up to higher sublayers within the LAC sublayer (block 622). Otherwise, if the message CRC fails and the answer is 'No' for block 620, then the message capsule is discarded (block 624).

If a message capsule contains some bad data and the message CRC fails, as determined in block 620, then there is some likelihood that the message size information for this erased message capsule is incorrect. In this case, the start of the next message capsule in the frame cannot be ascertained with certainty. The SAR sublayer may presume that the message size information in the erased message capsule is correct and may then process the next message capsule in the normal manner. Thus, from blocks 622 and 624, the process returns to block 612 to process the next message capsule, if any, sent in the frame. Alternatively, the SAR sublayer may discard all subsequent message capsules until the next synchronized message capsule is encountered (not shown in FIG. 6).

The message processing techniques described herein are not intuitive or obvious since the processing on the frames and the processing on the messages are performed by two different layers that are intended to operate independently of one another. To maintain strict layering, only good data is passed between the layers in the protocol stack. The techniques violate strict layering in order to improve performance.

The message processing techniques can provide several advantages. First, the techniques can achieve a lower message error rate (MER) for messages. Conventionally, each frame that is decoded in error is discarded even if only a portion of the frame contains bad data. The techniques can recover good messages from erased frames and thus improve the MER. Second, the techniques can improve message reception, prolong battery life, and extend standby time for a portable wireless device.

A wireless device typically operates in one of several states, such as an Active state or an Idle state, at any given moment. In the Active state, the wireless device can actively exchange data with one or more base stations in the system, e.g., for a voice or data call. In the Idle state, the wireless device typically monitors a designated control channel for messages applicable to the wireless device. Such messages may include page messages that alert the wireless device to the presence of an incoming call and overhead messages that carry system and other information for the wireless device. The designated control channel may be the FCCCH (which is assumed for the description below) or a paging channel (PCH).

The wireless device may operate in a Slotted mode to reduce power consumption while in the Idle state. In the Slotted mode, user-specific messages are sent to the wireless device at designated times, if at all. The FCCCH is divided into numbered slots, and the wireless device is assigned specific slots on which it may receive user-specific messages. In the Slotted mode, the wireless device periodically, rather than continuously, monitors the FCCCH for messages from the base stations in the system. The wireless device wakes up from a Sleep substate prior to its assigned slot, enters an Awake substate, and processes the FCCCH for messages. The wireless device remains in the Awake substate if a received message requires the wireless device to perform additional tasks, and reverts back to the Sleep substate otherwise. In the time period between successive presences in the Awake substate, the wireless device is in the Sleep substate and the base stations do not send any pages or user-specific messages to the wireless device. The wireless device powers down as much circuitry as possible in the Sleep substate in order to conserve battery power.

The message processing techniques can improve performance in the Idle state by allowing the wireless device to (1) enter operation in the Slotted mode sooner for the Idle state and (2) enter the Sleep substate quicker after each assigned slot while in the Slotted mode. The wireless device may operate in the Slotted mode after receiving a full set of overhead messages from the BCCH. This full set of overhead messages is sent every 1.28 seconds in cdma2000. The techniques allow the wireless device to collect the full set of overhead messages sooner and hence allow the wireless device to enter the Slotted mode and start conserving battery power sooner. Each base station typically sends more than one overhead message in one BCCH frame. By retaining and processing erased BCCH frames that potentially carry good overhead messages, the wireless device is likely to collect the full set of overhead messages sooner. The wireless device can thus start Slotted mode operation sooner, e.g., in multiples of 40 ms sooner, where 40 ms is the BCCH frame duration.

While in the Slotted mode, the wireless device wakes up periodically to monitor the FCCCH for its assigned slot. The wireless device remains in the Awake substate until it receives a General Page Message (GPM), a Universal Page Message (UPM), or an indication that there is no more message for the address type that the wireless device is configured to receive. An FCCCH frame often carries more than one GPM or UPM. The techniques allow the wireless device to recover good GPM or UPM from an erased frame, which can enable the wireless device to transition to the Sleep substate immediately without having to wait for a good frame. The wireless device can enter the Sleep substate in multiples of 20 ms sooner, where 20 ms is the FCCCH frame duration often used.

Figure 7:
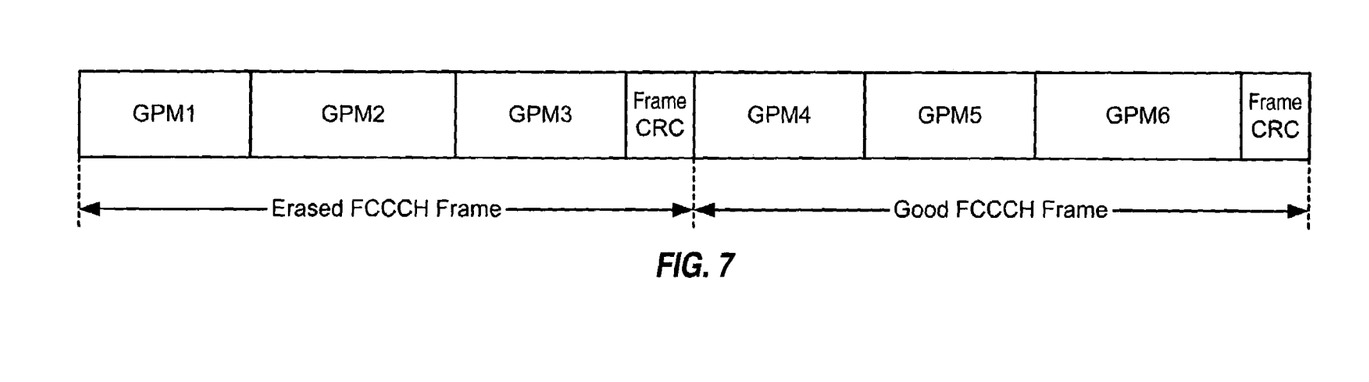
FIG. 7 shows decoding for two frames by the wireless device.

FIG. 7 shows an example of the decoding for two FCCCH frames by the wireless device. (FIG. 7 is shown below FIG. 4 in the drawings.) In this example, the first FCCCH frame carries three GPMs that are labeled as GPM1, GPM2 and GPM3. The second FCCCH frame also carries three GPMs that are labeled as GPM4, GPM5 and GPM6. In this example, the wireless device decodes the first FCCCH frame in error. However, the wireless device is able to recover GPM1 from the erased frame and is able to enter the Sleep substate after receiving GPM1. Without using the techniques described herein, the wireless device would discard the first FCCCH frame and would wait until the second FCCCH frame for the next GPM.

The message reception techniques can provide a lower missing page rate (MPR). MPR is the percentage of page messages that the wireless device missed among all of the page messages sent by the system for the wireless device. MPR is an important performance metric that is valued by network operators. The techniques allow the wireless device to recover good messages from erased FCCCH frames, which improves the likelihood of receiving pages sent for the wireless device. This translates to lower likelihood of missing an incoming call.

A simulation was performed to quantify the improvement achieved by the message processing techniques. In the simulation, the base station sends X frames over a period of T seconds on the BCCH/FCCCH. Each frame carries Y messages on average. The wireless device monitors the BCCH/FCCCH and attempts to recover the messages using two schemes: (1) a conventional scheme that discards all erased frames and recovers messages from only good frames and (2) a new scheme that processes all frames (good or erased) to attempt to recover the messages. The performance achieved by the new scheme was noticeably better than the performance achieved by the conventional scheme. The new scheme is able to deliver more good messages than the conventional scheme under the same channel and test conditions.

The frame erasure rate (FER) may be high under poor channel conditions. The techniques may provide significant improvement under adverse channel conditions when the likelihood of obtaining an erased frame may be high. The techniques generally provide greater performance improvement for control channels that are sent using a longer frame duration and hence have greater likelihood of a small portion of bad data causing frame erasure. The techniques also generally provide greater performance improvement for control channels in which more messages are sent per frame on average.

In the description above, CRC is used for error detection of messages and frames. In general, any error detection code may be used for error detection. An error detection code may also be called a frame check sequence (FCS), a frame quality indicator (FQI), or some other terminology. In the description herein and in the claims, the terms "cyclic redundancy check" and "CRC" generically refer to any error detection code.

For clarity, the message processing techniques have been specifically described for the BCCH and FCCCH in cdma2000. These techniques may also be used for other control channels in other systems such as, for example, a primary common control physical channel (P-CCPCH) carrying broadcast messages and a secondary CCPCH (S-CCPCH) carrying page messages in W-CDMA. In general, these techniques may be used for any physical layer channel in which messages from a higher layer are sent in frames to a lower layer (e.g., physical layer), where the messages are protected by CRC. The unit of transmission at the higher layer may also be called packet, SDU, PDU, and so on. The unit of transmission at the lower layer may also be called slot, packet, data block, and so on. The physical layer channels may also be called control channels, traffic channels, physical channels, and so on.

The message processing techniques described herein may be implemented by various means. For example, these techniques may be implemented in hardware, software, or a combination thereof. For a hardware implementation, the processing units used to recover messages may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the message processing techniques may be implemented with modules (e.g., procedures, functions, and so on) that perform the functions described herein. The software codes may be stored in a memory unit (e.g., memory unit 172 in FIG. 1) and executed by a processor (e.g., controller 170). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving messages in a wireless communication system, comprising:
   decoding at least one frame of data to obtain at least one decoded frame, wherein each frame of data carries a plurality of messages and has a cyclic redundancy check (CRC) value generated for the frame, and wherein each message has a CRC value generated for the message;
   processing each decoded frame, even if the decoded frame fails a CRC test, to extract messages sent in the decoded frame;
   determining a starting location of each message based on header information obtained from the at least one decoded frame;
   extracting each message from the at least one decoded frame based on the staffing location for the message;
   checking each message extracted from the at least one decoded frame based on the CRC value for the message; and
   for each of the messages, processing the message if the CRC value for the message passes a CRC test for the message and discarding the message that fails the CRC test for the message.

2. The method of claim 1, further comprising: processing a control channel to obtain the at least one frame of data.

3. The method of claim 1, wherein the checking each message extracted from the at least one decoded frame comprises
   obtaining the CRC value sent for the message,
   generating a new CRC value for the message based on received data for the message, and
   comparing the sent CRC value against the new CRC value to determine whether the message is decoded correctly or in error.

4. The method of claim 1, further comprising:
   presuming header information for each message to be correct even if the message fails a CRC test; and
   using the header information for each message, if applicable, to determine starting location of a next message.

5. The method of claim 1, further comprising:
   forwarding each of the at least one decoded frame from a first layer to a second layer in a protocol stack even if the decoded frame fails the CRC test.

6. The method of claim 1, wherein the decoding the at least one frame of data is performed by a first layer in a protocol stack, and wherein the processing each decoded frame and the checking each message are performed by a second layer residing above the first layer in the protocol stack.

7. The method of claim 1, further comprising:
   determining whether a designated overhead message has been recovered from the at least one decoded frame; and
   entering sleep if the designated overhead message has been recovered.

8. The method of claim 1, further comprising:
   determining whether a set of overhead messages has been recovered from the at least one decoded frame; and
   entering a slotted mode of operation if the set of overhead messages has been recovered.

9. An apparatus in a wireless communication system, comprising:
   a decoder operative to decode at least one frame of data to obtain at least one decoded frame, wherein each frame of data carries a plurality of messages and has a cyclic redundancy check (CRC) value generated for the frame, and wherein each message has a CRC value generated for the message; and
   a message processor operative to process each decoded frame, even if the decoded frame fails a CRC test, to extract messages sent in the decoded frame, to check each message extracted from the at least one decoded frame based on the CRC value for the message, and, for each of the messages, to process the message if the CRC value for the message passes a CRC test for the message and to discard the message that fails the CRC test for the message.

10. The apparatus of claim 9, further comprising:
    a demodulator operative to process a control channel to obtain the at least one frame of data.

11. The apparatus of claim 9, wherein the decoder is operative to perform physical layer processing on the at least one frame of data, and wherein the message processor is operative to perform layer 2 processing on each of the at least one decoded frame even if the decoded frame fails the CRC test.

12. The apparatus of claim 9, further comprising:
    a controller operative to determine whether a designated overhead message has been recovered from the at least one decoded frame and to initiate sleep if the designated overhead message has been recovered.

13. The apparatus of claim 9, further comprising:
    a controller operative to determine whether a set of overhead messages has been recovered from the at least one decoded frame and to enter a slotted mode of operation if the set of overhead messages has been recovered.

14. An apparatus in a wireless communication system, comprising:
    means for decoding at least one frame of data to obtain at least one decoded frame, wherein each frame of data carries a plurality of messages and has a cyclic redundancy check (CRC) value generated for the frame, and wherein each message has a CRC value generated for the message;
    means for processing each decoded frame, even if the decoded frame fails a CRC test, to extract messages sent in the decoded frame;
    means for checking each message extracted from the at least one decoded frame based on the CRC value for the message; and
    for each of the messages, means for processing the message if the CRC value for the message passes a CRC test for the message and discarding the message that fails the CRC test for the message.

15. The apparatus of claim 14, further comprising:
    means for processing a control channel to obtain the at least one frame of data.

16. The apparatus of claim 14, further comprising:
    means for forwarding each of the at least one decoded frame from a first layer to a second layer in a protocol stack even if the decoded frame fails the CRC test.

17. The apparatus of claim 14, wherein the means for decoding the at least one frame of data comprises means for decoding the at least one frame of data in accordance with a physical layer in a protocol stack, and wherein the means for processing each decoded frame comprises means for processing each decoded frame in accordance with a second layer residing above the first layer in the protocol stack.

18. The apparatus of claim 14, further comprising:
    means for determining whether a designated overhead message has been recovered from the at least one decoded frame; and means for entering sleep if the designated overhead message has been recovered.

19. The apparatus of claim 14, further comprising:
means for determining whether a set of overhead messages has been recovered from the at least one decoded frame; and
means for entering a slotted mode of operation if the set of overhead messages has been recovered.

20. The apparatus of claim 14, further comprising:
means for processing each of the messages if the CRC value for the message passes a CRC test for the message; and
means for discarding each of the messages that fails the CRC test for the message.

21. A processor readable media for storing instructions operable in a wireless device to:
receive at least one decoded frame obtained from at least one frame of data, wherein each frame of data carries a plurality of messages and has a cyclic redundancy check (CRC) value generated for the frame, and wherein each message has a CRC value generated for the message;
process each decoded frame, even if the decoded frame fails a CRC test, to extract messages sent in the decoded frame; and
determine a starting location of each message based on header information obtained from the at least one decoded frame;
extract each message from the at least one decoded frame based on the starting location for the message;
check each message extracted from the at least one decoded frame based on the CRC value for the message; and
for each of the messages, process the message if the CRC value for the message passes a CRC test for the message and discard the message that fails the CRC test for the message.

22. The processor readable media of claim 21, and further for storing instructions operable in the wireless device to:
determine whether a designated overhead message has been recovered from the at least one decoded frame; and
enter sleep if the designated overhead message has been recovered.

23. The processor readable media of claim 21, and further for storing instructions operable in the wireless device to:
determine whether a set of overhead messages has been recovered from the at least one decoded frame; and
enter a slotted mode of operation if the set of overhead messages has been recovered.

24. A method of recovering messages in a wireless communication system, comprising:
decoding at least one frame of data to obtain at least one decoded frame, wherein each frame of data carries a plurality of messages and has a cyclic redundancy check (CRC) value generated for the frame, and wherein each message has a CRC value generated for the message;
processing each decoded frame, even if the decoded frame fails a CRC test, to recover messages sent in the decoded frame;
determining a starting location of each message based on header information obtained from the at least one decoded frame;
extracting each message from the at least one decoded frame based on the starting location for the message;
passing each of the messages to a higher layer in a protocol stack if the CRC value for the message passes a CRC test for the message; and
discarding each of the messages that fails the CRC test for the message.

* * * * *